US012810465B2

(12) United States Patent
Nie et al.

(10) Patent No.: US 12,810,465 B2
(45) **Date of Patent: *Nov. 24, 2026**

(54) DEPTH-GUIDED STRUCTURE-FROM-MOTION TECHNIQUES

(71) Applicant: Amazon Technologies, Inc., Seattle, WA (US)

(72) Inventors: Xiaohan Nie, Lynnwood, WA (US); Michael Thomas Pecchia, Los Angeles, CA (US); Leo Chan, Bowen Islands (CA); Ahmed Aly Saad Ahmed, Bothell, WA (US); Muhammad Raffay Hamid, Seattle, WA (US); Sheng Liu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 187 days.

This patent is subject to a terminal disclaimer.

(21) Appl. No.: 18/749,025

(22) Filed: Jun. 20, 2024

(65) Prior Publication Data

US 2024/0346686 A1 Oct. 17, 2024

Related U.S. Application Data

(63) Continuation of application No. 17/684,197, filed on Mar. 1, 2022, now Pat. No. 12,046,002.

(51) Int. Cl.

*G06T 7/73* (2017.01)
*G06T 7/55* (2017.01)

(52) U.S. Cl.

CPC . *G06T 7/73* (2017.01); *G06T 7/55* (2017.01)

(58) Field of Classification Search

CPC .............. G06T 7/73; G06T 7/55; G06T 7/579
See application file for complete search history.

(56) References Cited

U.S. PATENT DOCUMENTS

| | | | | |
|---|---|---|---|---|
| 12,046,002 | B1 * | 7/2024 | Nie | G06T 7/73 |
| 2015/0094952 | A1 * | 4/2015 | Moeglein | G01S 19/14 701/532 |

OTHER PUBLICATIONS

S. Liu, X. Nie and R. Hamid, Depth-Guided Sparse Structure-from-Motion for Movies and TV Shows, Jun. 2022, 2022 IEEE/CVF Conference on Computer Vision and Pattern Recognition (CVPR), pp. 15959-15968. (Year: 2022).*

* cited by examiner

*Primary Examiner* — Jeffery A Brier
(74) *Attorney, Agent, or Firm* — Eversheds Sutherland (US) LLP

(57) ABSTRACT

Systems, devices, and methods are provided for depth-guided structure from motion. A system may obtain a plurality of image frames from a digital content item that corresponds to a scene and determine, based at least in part on a correspondence search, a set of 2-D keypoints for the plurality of image frames. A depth estimator may be used to determine a plurality of dense depth map for the plurality of image frames. The set of 2-D keypoints and the plurality of dense depth maps may be used to determine a corresponding set of depth priors. Initialization and/or depth-regularized optimization may be performed using the keypoints and depth priors.

20 Claims, 9 Drawing Sheets

200

400

500

600

700

DEPTH-GUIDED STRUCTURE-FROM-MOTION TECHNIQUES

CROSS REFERENCE TO RELATED APPLICATION(S)

This application is a continuation of U.S. application Ser. No. 17/684,197 filed Mar. 1, 2022, the disclosure of which is incorporated herein by reference in its entirety.

BACKGROUND

Estimating camera motion and 3D scene geometry in movies and TV shows is a standard task in video production. Existing Structure from Motion (SfM) approaches for 3D scene reconstruction produce high-quality results especially for images, but require large parallax to be accurate. On the other hand, however, creating engaging viewing experience in movies and TV shows often constrains the amount of camera movement while filming a shot. This often leads to insufficient parallax compared to standard SfM datasets captured specifically for the aforementioned 3D reconstruction techniques.

Insufficient parallax is one of the challenges that limits the effectiveness of existing geometry-based SfM techniques that recover camera motion and geometry based on the principle of motion-parallax. Algebraic methods for two-view reconstruction are numerically unstable in shots that lack sufficient motion-parallax. Conventional SfM pipelines (e.g., COLMAP) use various heuristics to handle small-parallax data, but these heuristics have shortcomings. For example, inlier ratio may be used to decide the two-view motion type to prevent two-view reconstruction from using panoramic image pairs, and filtering out points with small triangulation angles. These heuristics however require careful tuning and can fail completely when using data that has no image pairs with sufficient parallax. In contrast, learning-based approaches are able to handle data with small parallax more effectively as they can learn to predict depth and pose from large-scale labelled datasets. However, as these methods do not incorporate geometric-consistency constraints between images, their pose and depth estimates are not as accurate. Furthermore, the generalizability of these approaches heavily depends on the scale of labeled data used for their training.

Hybrid approaches have achieved more accurate results than learning-based approaches by employing learned depth priors as implicit constraints for geometric consistency. However, these approaches do not use robust estimators thus making them heavily dependent on the quality of used optical flow that can adversely affect their robustness. Moreover, these approaches require heavy compute and memory resources that prevents such models from scaling to larger problems.

Accordingly, existing techniques typically are less effective with small parallax. For example, the amount by which a camera can be moved while filming a particular shot for a movie or television show is often limited. In such contexts, the resulting small-motion parallax in video-frames makes standard geometry-based SfM approaches not as effective.

Figure 1:
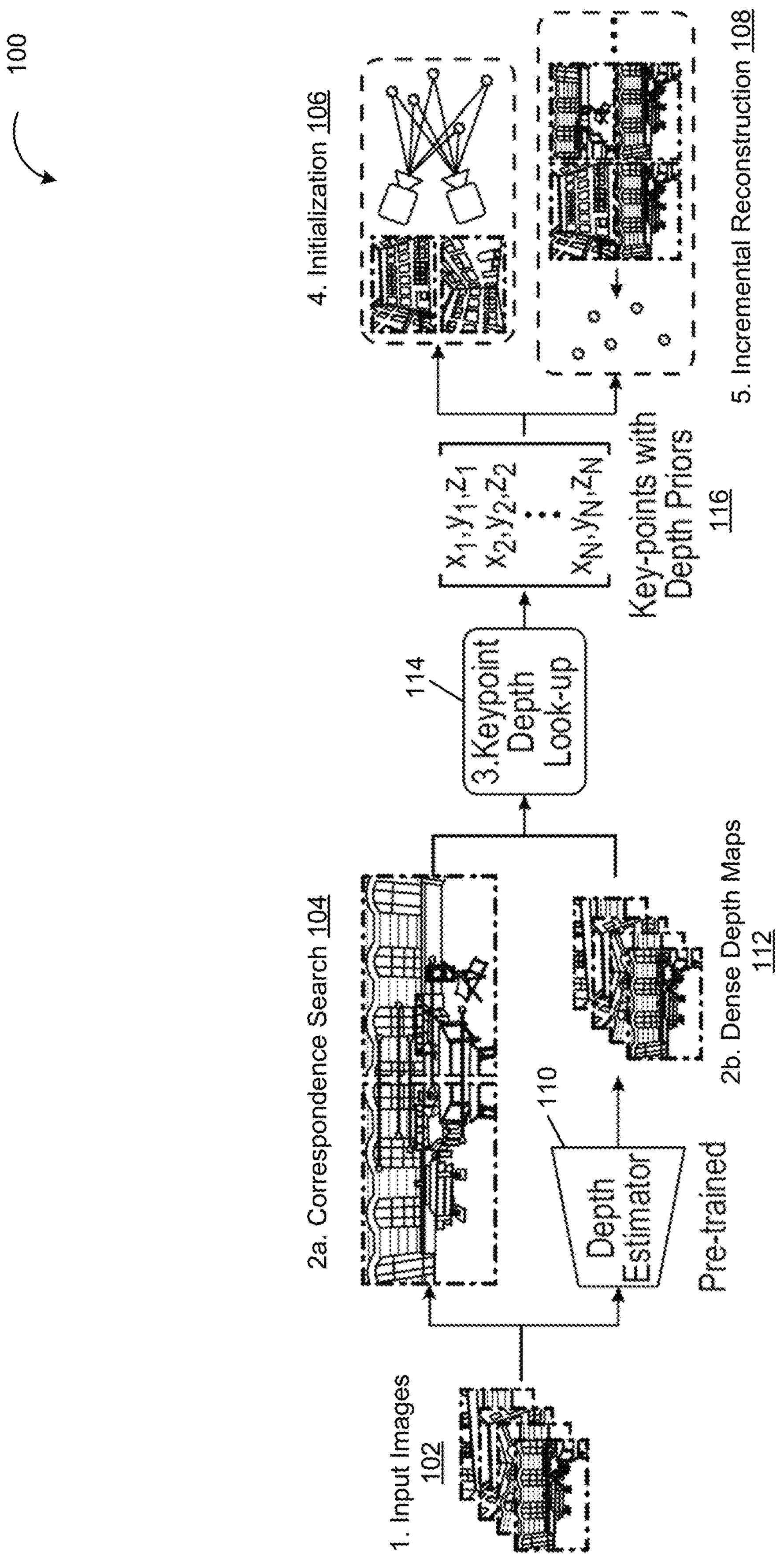
FIG. 1 illustrates an environment depicting a pipeline for implementing depth guided structure from motion, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for depth-guided structure-from-motion techniques that may be used for 3D-reconstruction. As described in greater detail below, techniques described herein may be utilized in small-parallax settings, but is not necessarily limited to such environments. In various embodiments, a pretrained network is used to obtain a single-frame depth-prior to improve geometry-based structure-from-motion (SfM). First, keypoints may be detected and then depth-estimates of the detected keypoints may be used to reconstruct a point cloud and camera-pose for an initial two-view reconstruction. Then, depth-regularized optimization may be performed to register new images and triangulate new points during incremental reconstruction. Various techniques described herein may be applied to computer system to improve the quality (e.g., accuracy) of the estimated camera poses and scene geometry for small-parallax setting, does not cause any degradation for data with large-parallax, and/or maintain the generalizability and scalability of geometry-based sparse SfM. In general, existing techniques for Structure-from-Motion fail to perform well in small-parallax settings, which is prevalent in the context of various types of media, including television and movies.

In various embodiments, hybrid techniques as described in greater detail below combine the strengths of a geometry-based SfM to achieve high-accuracy without requiring additional labelled data and learning-based SfM to effectively handle data with insufficient parallax. In various embodiments, instead of using epipolar geometry for initial two-view reconstruction, the hybrid approach directly utilizes monocular depth obtained from a pretrained model to accurately recover the initial camera pose and point cloud. During the incremental reconstruction step, a depth-prior regularized objective function is used to accurately register and triangulate new images and points. These techniques are robust to a variety of pretrained networks used to obtain the depth-prior, and maintain the generalizability and scalability of geometry-based SfM pipeline. For example, existing implementations (e.g., COLMAP) may be used.

The above descriptions are for purposes of illustration and are not meant to be limiting. Numerous other examples, configurations, processes, etc., may exist, some of which are described in greater detail below. Example embodiments will now be described with reference to the accompanying figures.

COLMAP is an open-source geometry-based SfM pipeline that can be used as a preliminary step for state-of-the-art dense reconstruction approaches. Like most geometry-based approaches, however, it requires images with sufficiently large baselines. Techniques described herein may be used to improve upon the approach of geometry-based SfM approaches, such as COLMAP to perform more robustly for small-parallax settings often found in movies and TV shows. COLMAP is described in greater detail in "Structure-from-motion revisited", CVPR, 2016 by Johannes L Schonberger and Jan-Michael Frahm, which is hereby incorporated by reference.

Geometry-based SFM has been attempted in a variety of previous approaches geared for videos with small motion to simplify the rotation matrix and parameterize bundle adjustment using inverse depth of reference image. Previous approaches have made the similar simplification and parameterizations as described above, but assume that camera intrinsics are unknown and optimize them in bundle adjustment. These works have generally only shown improved results for videos with very small accidental motion and do not generalize to data with relatively larger motion as is the case in movies and TV shows. Unlike prior approaches that have used priors for camera motion, at least one embodiment described herein utilizes priors for scene geometry that are robust to both narrow as well as wide baseline data.

Learning-based SfM has been attempted in a variety of previous approaches that were geared towards jointly estimating motion and depth in an end-to-end fashion. Previous works stacked multiple encoder-decoder networks for their iterative estimation. To improve the robustness of pose estimation, some prior works construct pose-cost volume similar to depth-cost volume used in stereo matching to predict camera pose iteratively. Unlike prior approaches that rely on ground truth labels for training, at least one embodiment described herein utilizes pre-trained depth estimators without the need of labels from target data. This greatly reduces the computational resources needed, as the time and effort involved in obtaining labeled training data and/or training of appropriate models may be computationally difficult and/or require dedicated computing resources in order to perform the training process efficiently.

Hybrid approaches have been attempted in a variety of previous approaches to optimize camera pose and depth by using geometry-consistency constraints. Depth has been represented as a linear combination of depth basis maps, and camera motion and depth has been computed by aligning deep features using differentiable gradient descent. Previous attempts have used dense optical flow to build dense correspondences, and iterate between learning based depth estimation and optimization based motion estimation. Previous attempts have optimized the reprojection loss by allowing depth to deform as splines for low-frequency alignment. Depth filters are used for high-frequency alignment to recover the details. In various embodiments described herein, optical flow is not required and the removal of this limitation allows for the approaches described herein to work well on enables techniques described herein to work on both videos as well as un-ordered image-sets.

FIG. 1 illustrates an environment 100 depicting a pipeline for implementing depth guided structure from motion, in accordance with one or more example embodiments of the present disclosure.

Deep networks and the availability of large-scale depth-data have contributed to progress in the field of monocular depth-estimation. A depth estimation network may be trained in a self-supervised manner using monocular videos. Multiple datasets for training using multiple objectives that are invariant to depth scale and range may be mixed. Depth may be divided into bins whose centers are estimated adaptively per-image, and can be linearly combined to predict the final depth value. In various embodiments, a pre-trained monocular depth estimator is utilized to generate depth-priors for sparse keypoints. Although monocular depth estimates are inconsistent across frames, as is made clear through techniques described in this disclosure, they can be utilized as priors in SfM pipeline to help the reconstruction process to converge to a better solution.

Input images 102 may refer to image frames of a movie or TV show. In general, movies and TV shows tend to have less camera motion to create an engaging viewing experience, as compared to ETH3D dataset and others. A digital content item may be segmented into scenes, and the input image frames for each scene may be processed together.

Various embodiments described herein build on incremental SfM. An incremental SfM pipeline may be divided into three components: (i) correspondence search 104, (ii) initialization 106, and (iii) incremental reconstruction 108. These components may be implemented, according to at least one embodiment, in the following manner:

With respect to (i) correspondence search 104, and according to at least one embodiment, for each image I in a given set of N images $\mathcal{I}$, their 2-D keypoints $p \in \mathbb{R}^2$ and respective appearance-based descriptors are extracted and used to match image-pairs $(I_a; I_b) \in \mathcal{I}$, using a similarity-metric based on their keypoint-descriptors. A robust estimator such as RANSAC can be used to perform robust geometric verification of the matched image-pairs in order to estimate the geometric transformation between them.

With respect to (ii) initialization 106, based on epipolar geometry of the corresponding 2-D keypoints in a matched image-pair ($I_a$; $I_b$), two-view reconstruction can be performed to estimate the initial camera pose ($R_{init}$; $t_{init}$)$\in$SE(3) and 3-D point cloud $P\in\mathbb{R}^3$. Recall that good initialization is important for incremental SfM pipelines as later steps may not be able to recover from a poor initialization. To this end, heuristics such as number of keypoint matches, triangulation angles and geometric-transformation types may be used to select a good image-pair likely to result in high-quality initialization.

With respect to (iii) incremental reconstruction 108, new images from the remaining image-set are incrementally incorporated into the reconstruction process by iterating through a three-step process. The three-step process may include an image registration step, in which a new image is registered to the current 3D scene by first solving the Perspective-n-Point (PnP) problem using RANSAC on 2D to 3D correspondences, and then refining the pose of the new image by minimizing its reprojection error. The three-step process may include a triangulation step in which scene points of the new image are triangulated and added to the existing scene The three-step process may include a bundle adjustment step in which the camera pose and 3-D point cloud are jointly refined by minimizing the total reprojection error of the currently registered images.

Under small-parallax settings, existing (ii) initialization techniques struggle to produce good initial two-view reconstruction due to unstable epipolar geometry, while incremental reconstruction tends to cover bad solutions due to large triangulation variation. In at least one embodiment of the present disclosure, keypoints with depth-prior 116 obtained from a pretrained network is used to improve initialization techniques under small-parallax settings.

Keypoint depth may be determined according to various techniques described in greater detail below. In at least one embodiment, given an image-set such as input images 102, a process as described herein uses a COLMAP pipeline for 2-D keypoints detection and matching. A pretrained depth estimator 110 may be used to obtain dense depth maps 112 for each input image. Moreover, the process may use a pretrained monocular depth-estimator to predict the dense depth map D_i for each image I_i. The keypoint depth 114 of keypoint p_i in I_i is extracted from D_i using bilinear interpolation as D_i [p_i]. The process may incorporate these keypoints with depth priors 116 in the initialization step to get a more accurate estimate of the initial camera pose and 3D point cloud, and regularize the optimization process of image registration and triangulation to guide the incremental reconstruction towards a better solution. By using the sparse keypoints-depth instead of dense depth map computation and memory efficiency may be maintained for large scale reconstruction. Various techniques described herein are agnostic to the choice of depth estimation model, which is evidenced by the empirical findings discussed below in relation to the ablation study.

The first step of incremental SFM is initialization. Its goal is to find a pair of images ($I_a$, $I_b$), estimate the relative camera pose between them ($R_{ab}$; $t_{ab}$)$\in$SE(3) and triangulate an initial 3D point cloud $P\in\mathbb{R}^3$ for the scene observed by both images. The initialization chosen by used in subsequent steps, and it is important to have good quality initialization, as subsequent steps may not be able to correct errors from a low quality initialization.

In various embodiments, initialization techniques are described in greater detail below for projecting 2-D keypoints into 3-D. Instead of computing the essential matrix from 2-D to 2-D correspondences between the initial image-pair ($I_a$, $I_b$), and decomposing it into rotation and translation matrices as done in COLMAP, keypoint-depth information is incorporated to formulate the initialization step as a Perspective-n-Point (PnP) problem. In at least one embodiment, a process comprises a step to create an initial point cloud $P_a$ by projecting the 2-D keypoints in $I_a$ into 3-D as follows:

$$P_a = D_a[p_a]K_a^{-1}h(p_a)\quad \forall\, p_a \in \mathcal{T}_a \qquad \text{(Eq. 1)}$$

where Da[$P_a$] is the depth of $p_a$, $K_a\in\mathbb{R}^{3\times3}$ is the intrinsic matrix of the camera that captured $I_a$, h(•) converts euclidean coordinates to homogeneous coordinates, and $\mathcal{T}_a$ is the set of 2-D keypoints in $I_a$. This results in an initial 3-D point cloud created from keypoints in $I_a$.

The relative pose between $I_a$ and $I_b$ is then estimated using geometric relationship between 2-D keypoints in $I_b$ and their corresponding 3-D points in the point cloud (2-D to 3-D correspondences), which is the goal of the PnP problem. Instead of estimating the relative pose using 2D to 2-D correspondences with epipolar geometry that is unstable under small baseline, using 2-D to 3-D correspondences with PnP approach in an initialization method according to at least one embodiment results in initialization that is much more robust to small baseline since PnP naturally prefers small baseline data.

Note that unlike COLMAP, which selects the initial image-pair by considering both triangulation angle and the number of matched keypoints, as described herein, a process may select the image pair which has the largest number of matched keypoints with valid depth. Valid depth may be considered as all values except 0 or infinity. In some cases, the valid depth is defined as a range of real numbers within the range of 0 to infinity In various embodiments, the number of matched keypoints used to generate the initial point cloud is determined based on the range of acceptable depth values. For example, if there are a large range of acceptable depth, more matched keypoints are used to generate the initial point cloud with larger scene-coverage, making subsequent reconstruction steps more robust and accurate.

In at least one embodiment, at least one implementation of depth guided SfM as described in this disclosure finds a pair of images for initialization using the number of keypoints as the metric. The pair of images which has the largest number of correspondences are selected for initialization. Larger number of correspondences means more redundancy for PnP which likely leads to more accurate camera pose estimation and also an initial 3D point cloud with.

Figure 2:
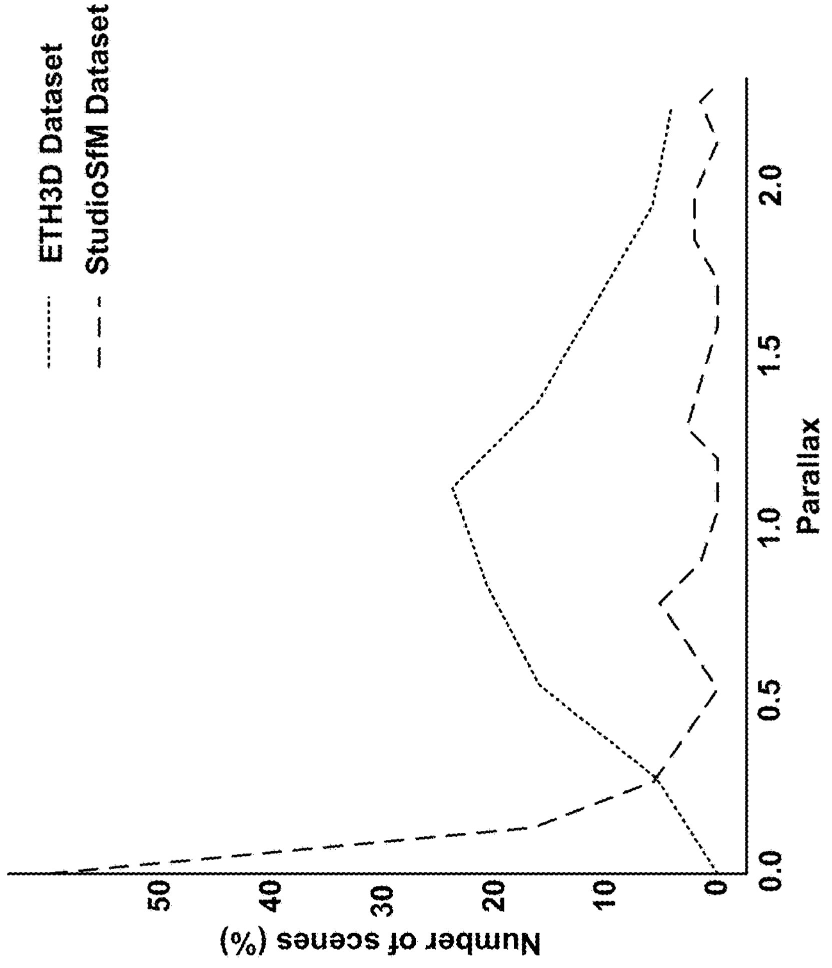
FIG. 2 depicts a graph showing the parallax distribution for ETH3D that is plotted with StudioSFM datasets.

FIG. 2 depicts a graph 200 showing the parallax distribution for ETH3D that is plotted with StudioSFM datasets. The x-axis of graph 200 is plotted against parallax, and the y-axis of graph 200 is plotted against the number of scenes as a percentage. Parallax may be computed as the ratio between maximum camera translation and the distance between the camera and a 3-D point. Accordingly, it may be appreciated that small-parallax may be a result of small movements at a close distance, translational camera movements from a long distance away, and so forth. These are provided as non-limiting examples of how small-parallax scenes may be shot, and should not be construed to limit the techniques for measuring parallax values.

To underscore the prevalence of small-baseline in studio-produced video-content, parallax-distribution is compared between StudioSfM dataset and a large-scale SfM dataset of ETH3D (shown in FIG. 2). Parallax may be computed as the ratio between the maximum translation of camera motion and the median distance of 3-D point cloud to all cameras. FIG. 2 shows that most videos of StudioSfM have small parallax because the shots in movies and TV shows tend to have less camera motion to create an engaging viewing experience. In contrast, ETH3D has a much larger parallax since it is captured specifically for the purposes of 3-D reconstruction using standard approaches. As can be seen in FIG. 2, a majority of the image frames in StudioSFM dataset, which includes typical shots from movies and TV shows, tend to have less camera motion. In various embodiments, digital content items such as TV shows and movies have a majority of shots with parallax that is under 0.25, 0.5, 1.0, 1.5, or 2.0.

Figure 3:
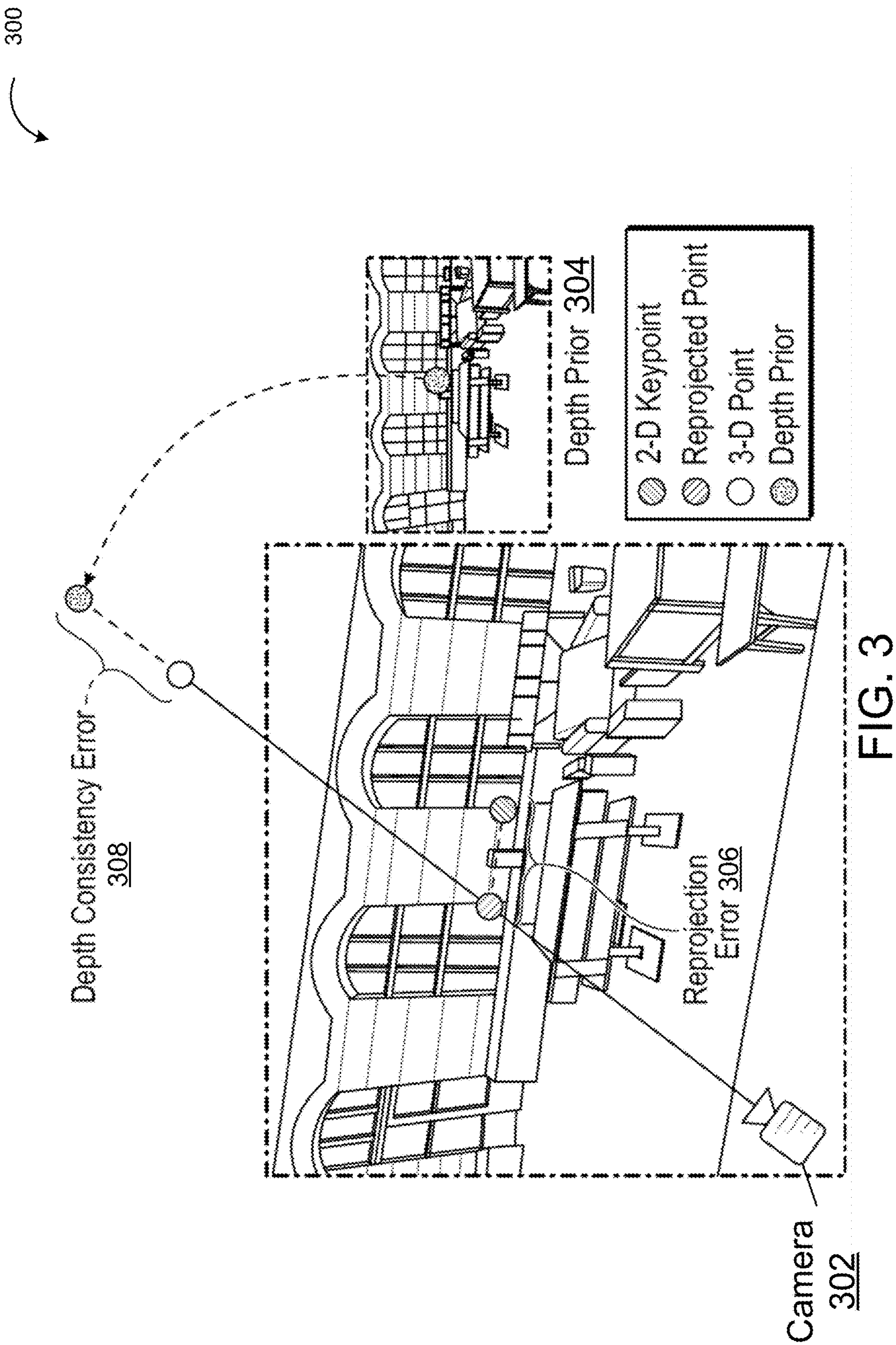
FIG. 3 illustrates a diagram depicting depth regularized optimization, in accordance with one or more example embodiments of the present disclosure.

FIG. 3 illustrates a diagram 300 depicting depth regularized optimization, in accordance with one or more example embodiments of the present disclosure. In at least one embodiment, diagram 300 depicts a depth-regularized optimization that incorporates both reprojection error 306 and depth consistency error 308 as regularizers for optimizing loss functions for image registration (Equation 2) and/or triangulation (Equation 5), according to various embodiments contemplated with the scope of this disclosure.

FIG. 3 depicts a camera 302 or other capture device that is used to capture a scene. A camera pose of an image $I_i$ captured by camera 302 may be defined as $(R_i; t_i) \in SE(3)$ where $R_i \in \mathbb{R}^{3\times3}$: a rotation matrix, $t_i \in \mathbb{R}^{3\times1}$: a translation vector.

In various embodiments, a process comprises an initialization step that is followed by: (a) image registration, which registers a new image to the existing scene and (b) triangulation, which triangulates the new points. In various embodiments, a novel depth-regularized objective is used to improve these two steps. The intuition of this approach is illustrated in FIG. 3 and its details are explained below.

In at least one embodiment, a process as described herein performs an image registration step that follows the procedure used in COLMAP to select next image $I_i$, and estimate its initial camera pose using PnP problem formulation with RANSAC. In at least one embodiment, this initial camera pose is further refined by minimizing the following objective function:

$$R_i^*, t_i^*, \gamma_i, \beta_i = \arg\min_{R,t,\gamma,\beta} \sum_{p_i \in \varphi_i} E_{PR}(p_i) + \lambda E_{DC}(p_i, \gamma_i, \beta_i) \quad \text{(Eq. 2)}$$

Here, $\varphi_i$ is the set of inliers keypoints obtained from RANSAC of initial pose estimation, while $E_{PR}$ is the reprojection loss and $E_{DC}$ is the depth consistency loss. $\lambda$ is the weight to balance the two losses. $E_{PR}$ is defined as:

$$E_{PR}(p_i) = \|\Pi(R_i P_i + t_i) - p_i\| \quad \text{(Eq. 3)}$$

where H represents the projection from 3-D points to image plane. Similarly $E_{DC}$ is defined as:

$$E_{DC}(p_i, \gamma_i, \beta_i) = \sum_{p_i \in \varphi_i} \|[R_i P_i + t_i]_z - \gamma_i D_i[p_i] - \beta_i\| \quad \text{(Eq. 4)}$$

where $D_i[p_i]$ is the depth of keypoints $p_i$, $[x]_z \in \mathbb{R}$, $x \in \mathbb{R}^3$ is the third element of the 3-D point x. $\gamma_i$, $\beta_i$ are the scale and shift to align the depth-prior 304 of $I_i$ with the projected depth from 3-D points.

In at least one embodiment, a process as described herein perform a triangulation step that follows the image registration step. In at least one embodiment, once image $I_i$ is registered (e.g., as described above), the newly observed scene points are added to the existing point cloud via triangulation. DLT and RANSAC may be used to estimate the initial 3-D position and refine it using the following objective function:

$$P_i^* = \arg\min_{P_i^{new}} \sum_{p_j \in N(P_i^{new})} E_{PR}(p_j) + \lambda E_{DC}(p_j, \gamma_i, \beta_i) \quad \text{(Eq. 5)}$$

where $$P_i^{new}$$

is the new set of 3-D points observed in $I_i$, $$N(P_i^{new})$$

is the set of 2-D keypoints corresponding to $$P_i^{new},$$

and $E_{PR}$ and $E_{DC}$ are the reprojection and depth consistency errors as defined above. $\gamma_i$, $\beta_i$ are computed from image registration and are kept fixed here. Note that the 3-D point estimated from triangulation based only on reprojection loss has large variance when the triangulation angle is small, resulting in poor performance in small parallax settings. The objective function described above addresses this challenge by regularizing the position of the 3-D point using the depth consistency error while keeping the reprojection error low.

Figure 4:
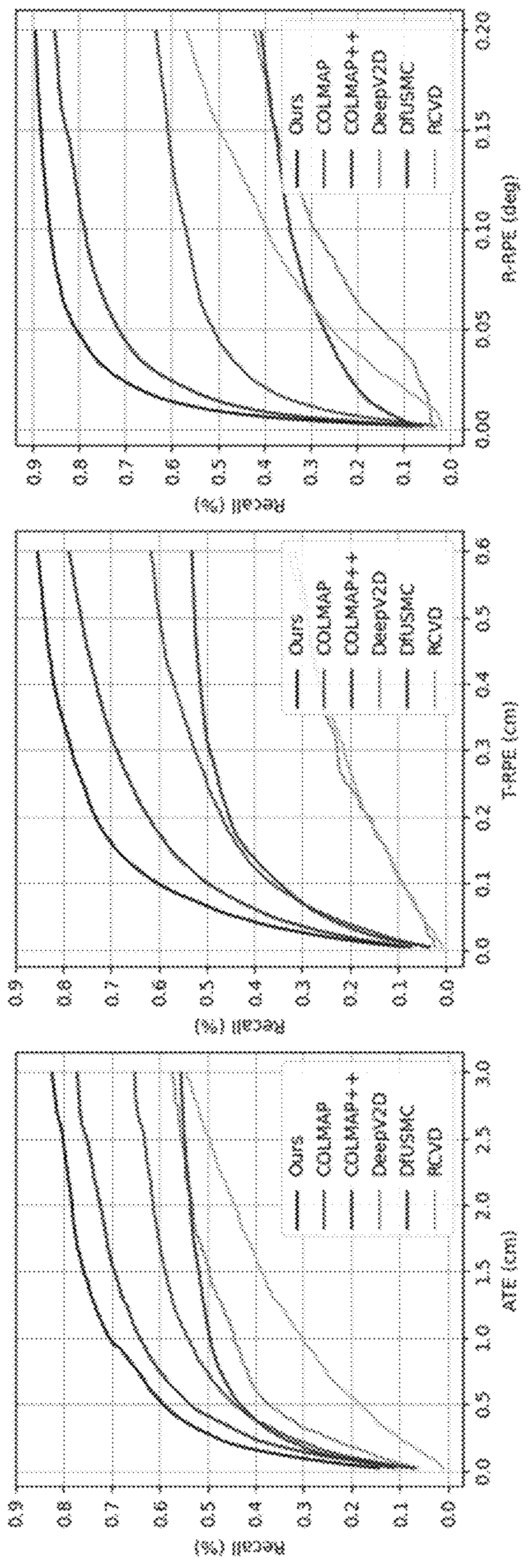
FIG. 4 illustrates evaluation of camera pose on StudioSFM dataset, in accordance with one or more example embodiments of the present disclosure.

FIG. 4 illustrates evaluation of camera pose on StudioSFM dataset, in accordance with one or more example embodiments of the present disclosure. In at least one embodiment, FIG. 4 depicts graphs 400 of the recall-curves of multiple methods for ATE (absolute trajectory error), T-RPE (relative pose error for translation), and R-RPE (relative pose error for rotation) for various existing methods in relation to an implementation of depth guided SfM as described in this disclosure. An implementation of depth guided structure from motion as described herein, labeled "Ours" is shown to perform significantly better than COLAMP, COLMAP++, DeepV2D, DfUSMC, and RCVD along ATE, T-RPE, and R-RPE evaluation metrics.

In various embodiments, SfM techniques described herein were comprehensively evaluated using a new dataset. In at least one embodiment, a new dataset (StudioSfM) of 133 shots with 21K frames from 15 TV-episodes was collected, as depicted in FIG. 4. While TV-episodes are described as being included in StudioSfM dataset, other types of digital content such as movies and videos may be included in the dataset in various suitable combinations. The ground truth camera pose and point clouds may be created manually by professionals using commercial computer graphics software. The StudioSfM dataset may be used to demonstrate that the SfM approaches described herein result in significantly more accurate camera poses and scene geometry over existing state-of-the-art approaches under small-parallax settings in studio-produced video-content. Additionally, it may be shown that the approaches described herein do not cause any degradation on standard SfM datasets with large parallax, and maintains the generalizability and scalability of standard SfM pipelines.

Techniques for evaluating SfM performance are described herein. For example, in at least one embodiment, for each full-length TV episode, shot segmentation is run to split the content into a set of constituent shots and then sparsely sampled these shots in a uniform manner. For each sampled shot, professional visual effects artists generated the ground-truth camera poses and 3-D point clouds through commercial CG software. Other ways of generating ground-truth data may include using computer vision techniques or machine learning models to produce the ground-truth data programmatically. The scale was determined based on reference objects in the scene such as actors and furniture. In some embodiments, shots are selectively removed when they were determined to be too challenging to be annotated due to factors such as heavy motion-blur and/or fully static camera.

SfM models according to techniques described herein were presented with ETH3D dataset to validate that the approach does not result in any accuracy-loss for data with large parallax. ETH3D is a standard SfM dataset with 13 indoor and outdoor scenes. Each scene contains a set of unordered images where precise camera poses and dense point cloud from a laser scan are provided. Other suitable canonical or reference dataset may be used to baseline the performance of the SfM models described herein.

In at least one embodiment, an approach described herein builds on the codebase of COLMAP. In at least one embodiment, an approach described herein uses DPT-large as a default depth estimator for producing depth-priors. The influence of using different depth models on methods described herein is analyzed in the ablation study described below. Input image height is resized to 384 while maintaining the original aspect ratio, according to at least one embodiment. The dense depth map is resized to the original image size using nearest neighbor interpolation. The weight $\lambda$ for depth regularized optimization is always kept fixed at 6. Mask-RCNN is used to create binary masks of humans which are used as input for all compared approaches.

Unlike comparisons provided by previous approaches that only use original COLMAP on videos with small camera-motion, hyper-parameters are tuned for small-parallax settings to make it much less likely to fail on small-parallax data in order to have a fairer comparison. This version of COLMAP may be referred to as COLMAP++, and representative models described herein may be compared against the original COLMAP, COLMAP++, DeepV2D, RCVD, and DfUSMC.

In at least one embodiment, camera pose is evaluated by computing three commonly used metrics: absolute trajectory error (ATE), relative pose error for translation (T-RPE) and rotation (R-RPE). For evaluate 3-D point cloud, point cloud is projected to each frame using estimated camera-pose and measure the accuracy of relative depth $$\delta = \max\left(\frac{y_i^*}{y_i}, \frac{y_i}{y_i^*}\right)$$

and absolute depth $$\theta = |y_i - y_i^*|$$

under different thresholds where $\gamma_i$ and $$y_i^*$$

are the estimated and ground truth depth.

The quality of the estimated camera pose on StudioSFM dataset may be evaluated, as described in greater detail below. The predicted camera poses are aligned with the ground truth camera pose using similarity transformation before computing the metrics. FIG. 4 shows the plot of recall against three error metrics and Table 1 shows the area-under-curve (AUC) for each curve. As can be seen, depth guided SfM techniques described herein significantly outperform other approaches across all three metrics. COLMAP++ performs much better than original COLMAP showing the importance of tuning it to work with small parallax datasets. DfUSMC does not work well on StudioSFM which indicates that their assumptions about camera-motion do not generalize to this dataset. DeepV2D also shows low performance on StudioSFM likely due to their lack of outliers handling mechanisms. To further clarify the benefit of depth guided SfM approach for small parallax settings, videos in StudioSfM dataset were sorted according to their parallax in descending order, and the top 30% of dataset was used as the large-parallax set and bottom 30% as the small-parallax set. Estimated camera poses generated by an implementation of depth guided SfM was compared with COLMAP++ using these two sets.

Figure 5:
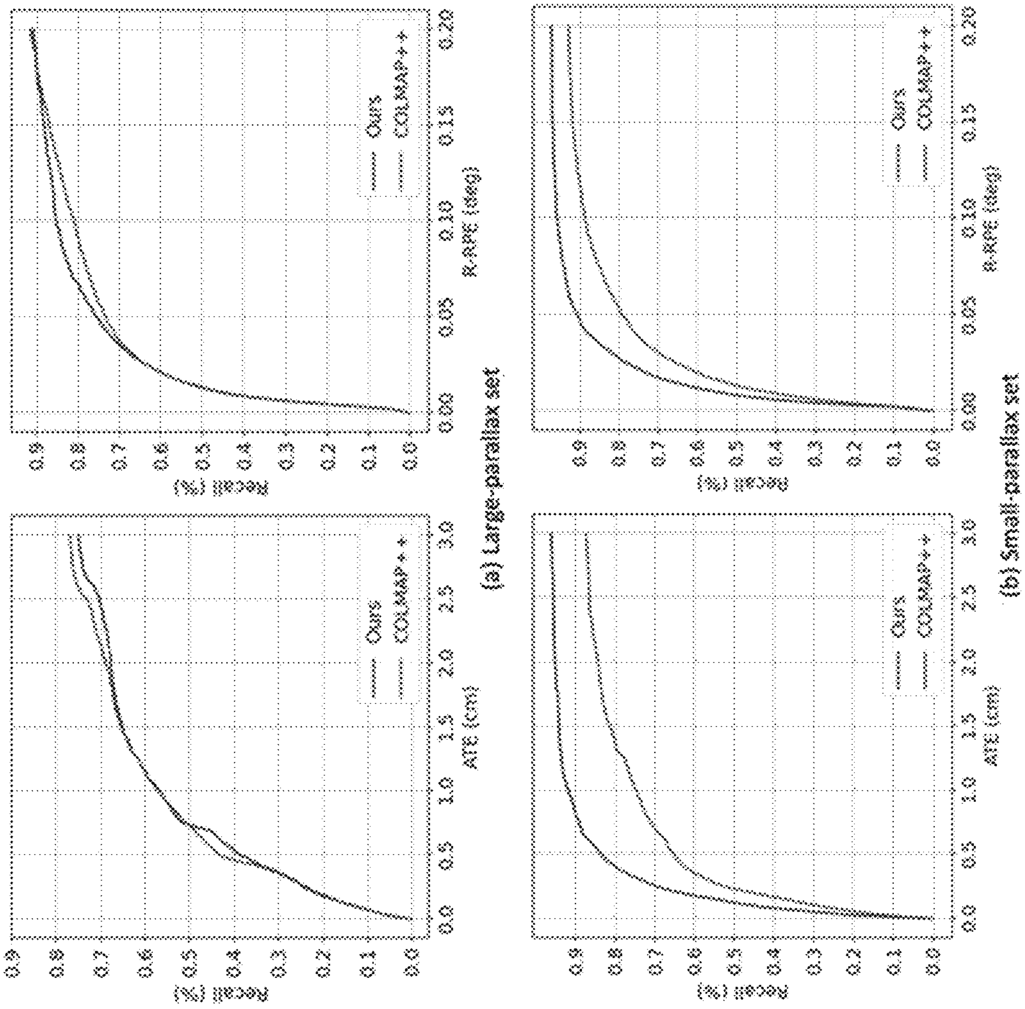
FIG. 5 illustrates graphs of camera pose estimation using StudioSFM dataset under various settings, in accordance with one or more example embodiments of the present disclosure.

FIG. 5 illustrates graphs 500 of camera pose estimation using StudioSFM dataset under various settings, in accordance with one or more example embodiments of the present disclosure. In at least one embodiment, FIG. 5 depicts upper graphs under (a) large-parallax setting and lower graphs under (b) small-parallax setting. As can be seen, an implementation of depth guided structure from motion (labeled as "ours") performs significantly better than COLMAP++ on small-parallax data and performs similarly to COLMAP++ on large-parallax data. FIG. 5 shows the significantly better performance of depth guided SFM approach described herein on small-parallax set, highlighting the importance of using depth-priors in geometry-based SfM for small-parallax settings.

Depicted below is Table 1, which provides camera pose evaluation on StudioSfM dataset using AUCs for absolute trajectory error (ATE), relative pose error for translation (T-RPE) and rotation (R-RPE) to evaluate performance of RCVD, DfUSMC, DeepV2D, COLMAP, COLMAP++, and an implementation of a depth guided SfM approach, according to at least one embodiment of the present disclosure. As can be seen in Table 1, the depth guided SfM approach outperforms existing models with respect to ATE, T-RPE, and R-RPE metrics. The relative performance increase is included in parentheses:

To demonstrate the effectiveness of an implementation of depth guided SfM described herein on standard SfM datasets, it was assessed on ETH3D where motion-parallax is significantly larger than StudioSfM. Estimated camera pose were compared with original COLMAP which is already tuned for large-parallax.

Camera pose comparisons presented in Table 3 shows that while both COLMAP and an implementation of depth guided SfM achieve impressive performance, the implementation of depth guided SfM is still able to slightly outperform COLMAP. The comparison of depth is shown in Table 4 in which better absolute depth accuracy than COLMAP is achieved. Overall better performance by the implementation of depth guided SfM on ETH3D demonstrates that this approach does not show any degradation on large-parallax data while offering significant gains for small-parallax settings.

As depicted in Table 3 below, AUCs for absolute trajectory error (ATE), relative pose error for translation (T-RPE)

TABLE 1

Camera Pose Evaluation

| Method | ATE AUC | | T-RPE AUC | | R-RPE AUC | |
|---|---|---|---|---|---|---|
| | 0.2 (cm) | 2.0 (cm) | 0.1 (cm) | 0.5 (cm) | 0.02 (°) | 0.1 (°) |
| RCVD | 4.2 | 28.0 | 5.0 | 17.5 | 4.4 | 23.1 |
| DfUSMC | 22.1 | 45.8 | 23.8 | 43.0 | 14.5 | 25.7 |
| DeepV2D | 15.2 | 43.8 | 5.6 | 19.2 | 4.6 | 15.8 |
| COLMAP | 20.0 | 49.6 | 23.1 | 45.8 | 25.8 | 46.7 |
| COLMAP++ | 24.7 | 59.1 | 34.3 | 60.1 | 39.7 | 66.0 |
| Depth Guided SFM | 31.8 (+7.1) | 65.3 (+6.2) | 41.6 (+7.3) | 69.8 (+9.7) | 48.7 (+9.0) | 74.8 (+8.8) |

To evaluate the quality of estimated point clouds, project point clouds are projected into each frame using the estimated camera-pose and then compare depths of the projected points with ground truth depths. Besides computing the accuracy using relative depth error as done in DeepV2D, the accuracy is also computed using absolute depth error as the ground truth point clouds are annotated using real-world scale. Table 2 shows that an implementation of depth guided SfM described herein outperforms all other approaches that were tested on both relative and absolute depth error. Directly applying DPT-large does not produce accurate depths even though they can visually look good. In contrast, using the output of DPT-large as depth-priors in geometry-based SfM substantially improves the quality of estimated depth.

Depicted in table 2 below, recall is measured using relative depth and absolute depths. Additionally, results for DPT-large are presented as a reference:

TABLE 2

Depth Estimation Evaluation

| Method | Relative Depth Accuracy (%) | | | Absolute Depth Accuracy (%) | | |
|---|---|---|---|---|---|---|
| | $\delta < 1.25$ | $\delta < 1.25^2$ | $\delta < 1.25^3$ | $\theta < 5$ cm | $\theta < 10$ cm | $\theta < 25$ cm |
| DPT-large* | 33.5 | 53.6 | 64.9 | 3.8 | 7.4 | 14.5 |
| RCVD | 43.7 | 66.5 | 79.4 | 5.2 | 9.1 | 18.7 |
| DfUSMC | 27.6 | 39.6 | 46.4 | 2.4 | 4.5 | 8.9 |
| Deep V2D | 63.4 | 80.1 | 87.5 | 8.9 | 15.5 | 28.8 |
| COLMAP | 50.8 | 55.1 | 56.9 | 20.7 | 27.3 | 38.3 |
| COLMAP++ | 72.9 | 81.4 | 85.0 | 22.8 | 32.6 | 50.6 |
| Depth Guided SFM | 80.0 | 86.0 | 89.3 | 27.1 | 39.0 | 57.3 |

and rotation (R-RPE) are provided for COLMAP and an implementation of depth guided SfM according to the present disclosure.

TABLE 3

Camera-pose Evaluation on ETH3D Using AUC

| Method | ATE AUC | | T-RPE AUC | | R-RPE AUC | |
|---|---|---|---|---|---|---|
| | 0.2 (cm) | 2.0 (cm) | 0.1 (cm) | 0.5 (cm) | 0.02 (°) | 0.1 (°) |
| COLMAP | 95.7 | 99.4 | 96.7 | 98.7 | 27.2 | 70.6 |
| Depth Guided SfM | 99.5 | 99.9 | 97.1 | 99.1 | 27.7 | 69.8 |

As depicted in Table 4 below, accuracy of depth estimation on ETH3D dataset by COLMAP and an implementation of depth guided SfM according to the present disclosure are compared using both relative depth and absolute depth.

TABLE 4

Evaluation of Depth Estimation on ETH3D Dataset

| | Relative Depth Accuracy (%) | | | Absolute Depth Accuracy (%) | | |
|---|---|---|---|---|---|---|
| Method | $\delta < 1.05$ | $\delta < 1.05^2$ | $\delta < 1.05^3$ | $\theta < 1$ cm | $\theta < 2$ cm | $\theta < 5$ cm |
| COLMAP | 96.9 | 98.1 | 98.5 | 58.7 | 72.9 | 86.0 |
| Depth Guided SFM | 96.8 | 98.0 | 98.4 | 61.2 | 75.7 | 88.1 |

Figure 6:
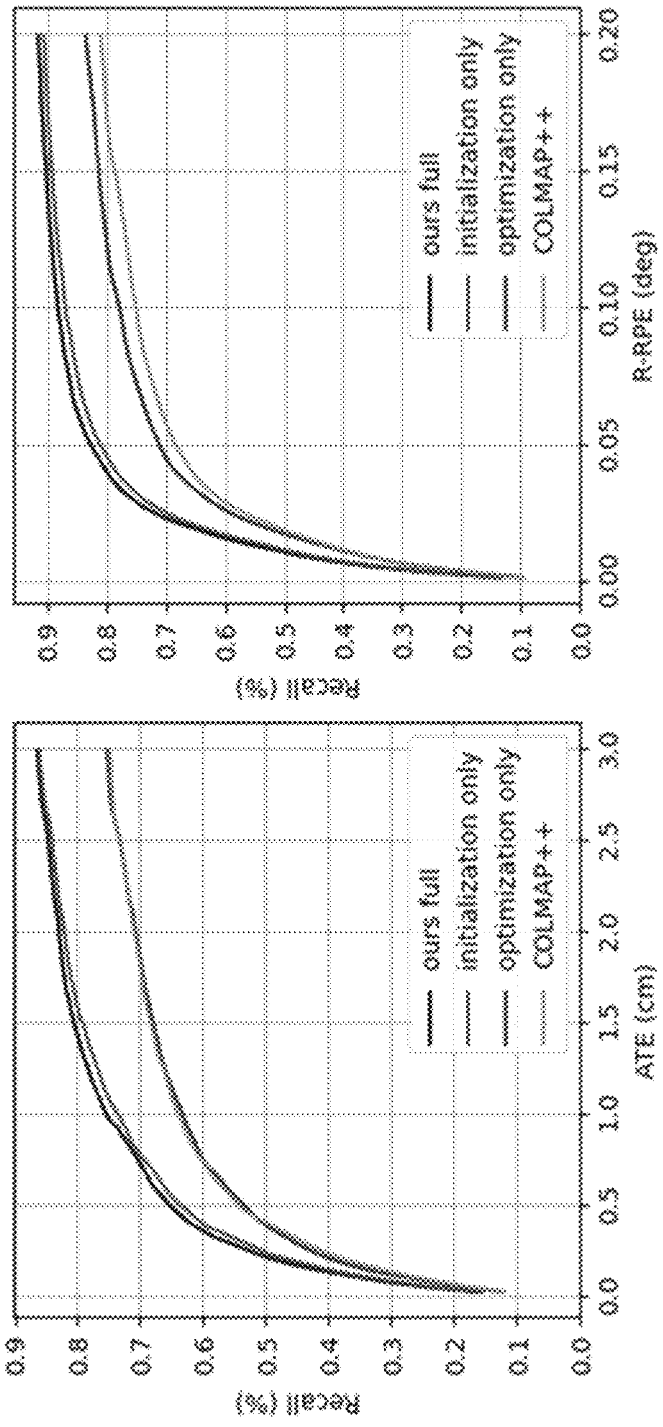
FIG. 6 illustrates graphs of ablation study using StudioSFM dataset, according to at least one embodiment of the present disclosure.

FIG. 6 illustrates graphs 600 of ablation study using StudioSFM dataset, according to at least one embodiment of the present disclosure. Recall of translation error and relative rotation error are plotted for different variants. As depicted in graph 600, a full implementation of depth guided structure from motion—for example, as described in connection with FIGS. 1 and 8—is referenced as "ours full" whereas those that utilize depth-guided SFM only for initialization is labeled as "initialization only" and where only depth-regularized optimization is used is labeled as "optimization only."

Several variants of depth guided SfM were considered and compared with COLMAP++ on StudioSfM dataset. FIG. 6 compares the recall curves for ATE and R-RPE between COLMAP++, depth guided SfM with only improved initialization (initialization only), depth guided SfM with only depth-regularized optimization (optimization only) and depth guided SfM (full). It can be seen that the proposed initialization using depth-prior of keypoints achieves substantial improvement over COLMAP++, showing the contribution of the initialization techniques described for SfM pipeline to converge to a good solution. With both improved initialization and depth regularized optimization, the full approach performs the best.

To assess the robustness of depth guided SfM approaches to the choice of depth-estimator, camera pose estimation was evaluated using several off-the-shelf pretrained depth estimation models based on various network architectures and trained with different datasets. Specifically, a comparison involving five monocular depth estimation models, including MiDaS small which is designed for mobile devices, DPThybrid and DPT-large which are based on Transformers, AdaBins which is the latest approach for monocular depth estimation and MC which focuses on human depth estimation.

Figure 7:
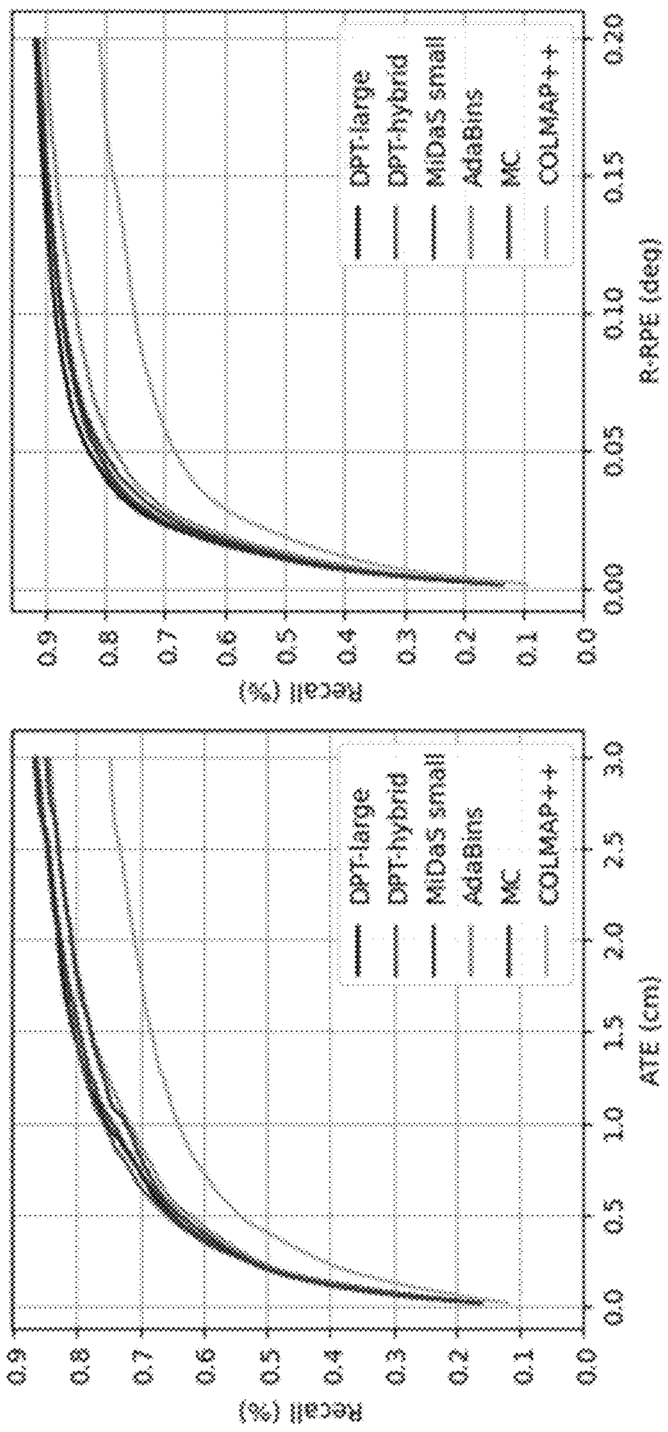
FIG. 7 illustrates graphs of ablation study of depth estimators for StudioSFM dataset, according to at least one embodiment of the present disclosure.

FIG. 7 illustrates graphs 700 of ablation study of depth estimators for StudioSFM dataset, according to at least one embodiment of the present disclosure. FIG. 7 shows that depth guided approach significantly outperforms COLMAP++ using depth priors provided by any of the five different pretrained depth estimation models. The small performance variation among those depth estimators demonstrates that depth guided SfM approaches does not rely on a particular depth estimator and is robust to diverse network architectures and training datasets. Different implementations of depth guided SfM may utilize different depth-estimator implementations.

In addition to evaluating the use of various depth estimators the robustness of depth guided SfM approaches were tested under different amounts of synthetic noise. For each keypoint depth d, random Gaussian noise with 0 mean and $\alpha \cdot d$ standard deviation with different values of $\alpha$ was added. As shown in Table 5, the performance degradation of an implementation of depth guided SfM approach is only within 5% under the largest added noise level 0.4 which demonstrates that depth guided SfM pipelines can tolerant sizable amounts of errors in the estimated depth-priors.

As depicted below, Table 5 depicts depth noise analysis findings for camera pose estimation. Gaussian noise with 0 mean and $\alpha \cdot d$ standard deviation with different values of $\alpha$ were added to each keypoint with depth d for an implementation of depth guided SfM as described in this disclosure. The performance degradation is within 5% for $\alpha$ of 0.4, which demonstrates that the approach is robust to errors in estimated depth-priors.

TABLE 5

Depth Noise Analysis For Camera Pose Estimation

| | ATE AUC | | T-RPE AUC | | R-RPE AUC | |
|---|---|---|---|---|---|---|
| $\alpha$ | 0.2 (cm) | 2.0 (cm) | 0.1 (cm) | 0.5 (cm) | 0.02 (°) | 0.1 (°) |
| 0.0 | 31.8 | 65.3 | 41.6 | 69.8 | 48.7 | 74.8 |
| 0.1 | 31.1 | 63.9 | 39.4 | 67.6 | 47.1 | 73.0 |
| 0.2 | 30.3 | 62.8 | 39.2 | 67.5 | 47.0 | 73.5 |
| 0.4 | 28.5 | 62.7 | 38.5 | 67.0 | 44.6 | 71.9 |

Figure 8:
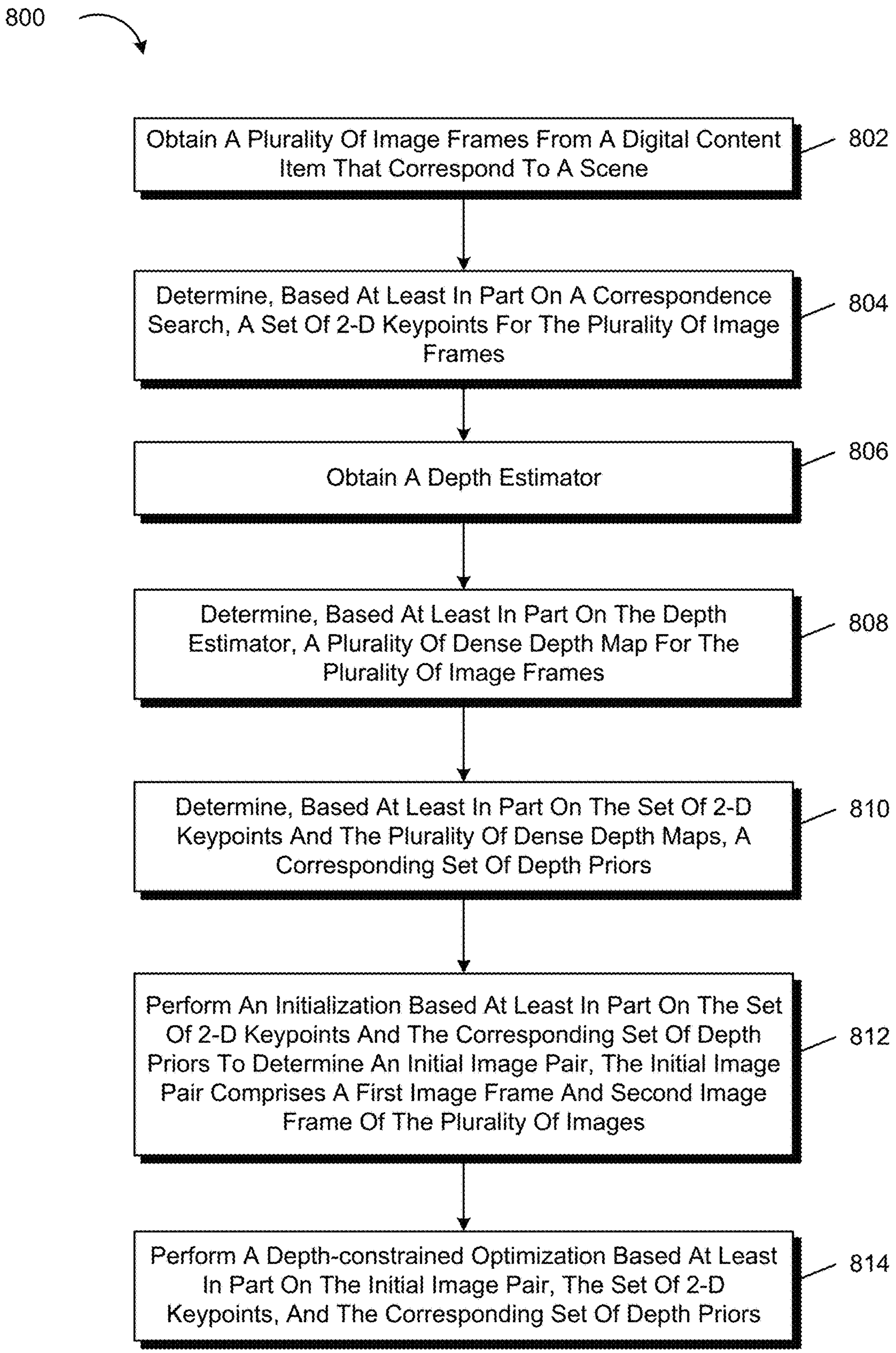
FIG. 8 shows an illustrative example of a process 800 for 3-D reconstruction using depth guided structure from motion (SfM) techniques, in accordance with one or more example embodiments of the present disclosure.

FIG. 8 shows an illustrative example of a process 800 for 3-D reconstruction using depth guided structure from motion (SfM) techniques, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1 and 9. In at least one embodiment, process 800 or a portion thereof is implemented by a computing resource service provider.

In at least one embodiment, process 800 comprises a step to obtain a plurality of image frames from a digital content item that corresponds to a scene 802. A digital content item may refer to a movie, TV show, or other videos. In general, real-world content tends to include a higher proportion of scenes with small-parallax, as depicted in the comparison between StudioSFM and ETH3D dataset in FIG. 2. In various embodiments, the plurality of image frames are extracted from a scene of a movie, TV show, etc., and provided to a system performing process 800 for 3-D reconstruction of the scene that is depicted in the digital content item.

In at least one embodiment, process 800 comprises a step to determine, based at least in part on a correspondence search, a set of 2-D keypoints for the plurality of image frames 804. According to at least one embodiment, for each image I in a given set of N images $\mathcal{J}$, their 2-D keypoints $p \in \mathbb{R}^2$ and respective appearance-based descriptors are extracted and used to match image-pairs $(I_a; I_b) \in \mathcal{J}$, using a similarity-metric based on their keypoint-descriptors. A robust estimator such as RANSAC can be used to perform robust geometric verification of the matched image-pairs in order to estimate the geometric transformation between them.

In at least one embodiment, process 800 comprises a step to obtain a depth estimator 806. The depth estimator may be a pre-trained monocular depth estimator that is utilized to generate depth-priors for sparse keypoints. Although monocular depth estimates are inconsistent across frames, as is made clear through techniques described in this disclosure, they can be utilized as priors in SfM pipeline to help the reconstruction process to converge to a better solution.

In at least one embodiment, process 800 comprises a step to determine, based at least in part on the depth estimator, a plurality of dense depth maps for the plurality of image frames 808. A pretrained depth estimator may be used to obtain dense depth maps for each input image. Moreover, the process may use a pretrained monocular depth-estimator to predict the dense depth map $D_i$ for each image $I_i$.

In at least one embodiment, process 800 comprises a step to determine, based at least in part on the depth estimator, a plurality of dense depth map for the plurality of image frames 808. A pretrained depth estimator may be used to obtain dense depth maps for each input image. Moreover, the process may use a pretrained monocular depth-estimator to predict the dense depth map $D_i$ for each image $I_i$.

In at least one embodiment, process 800 comprises a step to determine, based at least in part on the set of 2-D keypoints and the plurality of dense depth maps, a corresponding set of depth priors 810. In at least one embodiment, depth prior of keypoint $p_i$ in $I_i$ is extracted from its dense depth map $D_i$ using bilinear interpolation as $D_i[p_i]$. The process may incorporate these keypoints with depth priors in the initialization step to get a more accurate estimate of the initial camera pose and 3D point cloud, and regularize the optimization process of image registration and triangulation to guide the incremental reconstruction towards a better solution. By using the sparse keypoints-depth instead of dense depth map computation and memory efficiency may be maintained for large scale reconstruction. Various techniques described herein are agnostic to the choice of depth estimation model, which is evidenced by the empirical findings discussed below in relation to the ablation study.

In at least one embodiment, process 800 comprises a step to perform an initialization based at least in part on the set of 2-D keypoints and the corresponding set of depth priors to determine an initial image pair, the initial image pair comprises a first image frame and second image frame of the plurality of images 812. Initialization may be performed in any suitable manner described herein, including techniques described in connection with FIGS. 1 and 3.

In at least one embodiment, initialization comprises finding a pair of images using the number of keypoints as the metric. The pair of images that has the largest number of correspondences are selected for initialization, according to at least one embodiment. Image frames with larger number of correspondences may be suitable for use as the initial image pair because larger numbers of correspondences provide for more redundancy for PnP, which tends to lead to more accurate camera pose estimation and also an initial 3-D cloud with larger coverage of the scene.

In at least one embodiment, process 800 comprises a step to perform a depth-constrained optimization based at least in part on the initial image pair, the set of 2-D keypoints, and the corresponding set of depth priors 814. Depth-constrained optimization may be performed in any suitable manner described herein, including techniques described in connection with FIGS. 1 and 3.

In at least one embodiment, after initialization of a 3-D point cloud and initial camera pose (e.g., from the initial image pair), the remaining images of the scene are registered incrementally. In some embodiments, all images of a scene are registered. In some embodiments, some image frames are omitted, for example, where there is motion blur or other factors that make the image frames unsuitable for depth-constrained optimization. Depth-constrained optimization may involve depth-constrained pose refinement and/or depth-constrained triangulation, according to at least one embodiment.

In at least one embodiment, each time an image is registered to a 3-D point cloud, the camera pose is refined by minimizing a first objective function that includes a reprojection error for a set of keypoints and a depth consistency error for the set of keypoints.

In at least one embodiment, after an image is registered, 3-D points are added to the point cloud via triangulation. Given a correspondence, triangulation aims to estimate the location of a 3-D point by minimizing loss of a second objective function that includes a reprojection loss for pairs of points and depth consistency errors for the pairs of points.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 9:
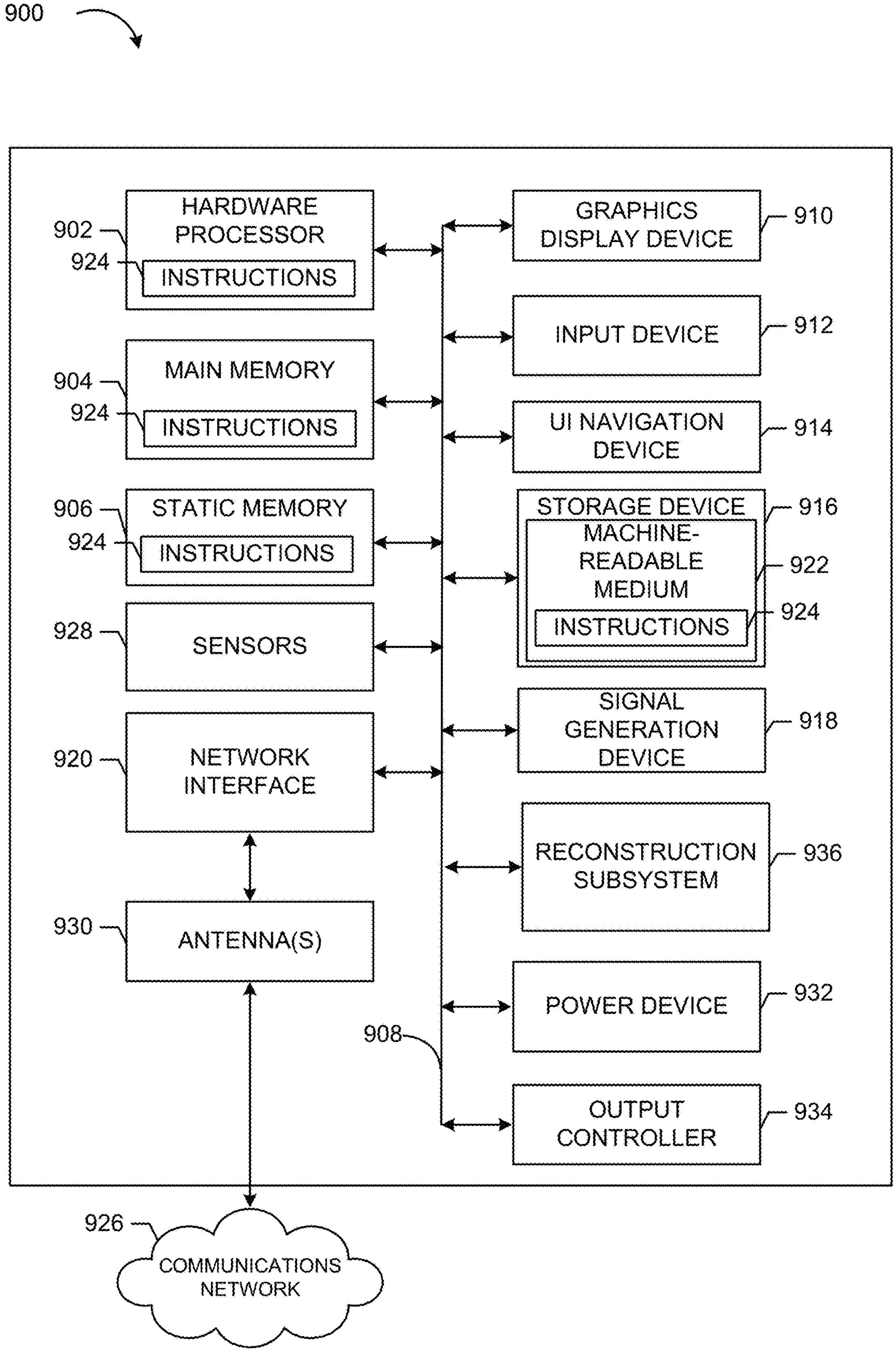
FIG. 9 illustrates a block diagram of an example machine upon which any of one or more techniques (e.g., methods) may be performed, in accordance with one or more example embodiments of the present disclosure.

FIG. 9 illustrates a block diagram of an example of a machine 900 (e.g., implemented in whole or in part in the context of embodiments described in connection with other figures. In some embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in Wi-Fi direct, peer-to-peer (P2P) (or other distributed) network environments. The machine 900 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include any combination of the illustrated components. For example, the machine 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (e.g., drive unit) 916, a signal generation device 918, and a network interface device/transceiver 920 coupled to antenna(s) 930. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

Reconstruction subsystem 936 may refer to software, hardware, or a combination thereof that implements depth guided structure from motion approaches described herein. For example, techniques described in connection with FIGS. 1, 3, and/or 8 may be implemented using reconstruction subsystem 936 of machine 900. In various embodiments, reconstructions subsystem 936 is used to perform 3-D reconstruction of scenes depicted in digital content items, such as TV shows, movies, or other types of digital media.

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, “can,” “could,” “might,” or “may,” unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:

one or more processors; and memory storing executable instructions that, as a result of execution by the one or more processors, cause the system to:

obtain a plurality of image frames from a digital content item that corresponds to a scene;

determine, based at least in part on a correspondence search, a set of keypoints for the plurality of image frames;

determine a dense depth map for one or more of the plurality of image frames;

determine, based at least in part on the set of keypoints and the dense depth map, a corresponding set of depth priors for the set of keypoints;

perform an initialization based at least in part on the set of keypoints and the corresponding set of depth priors to determine an initial image frame pair determine a camera pose based at least in part on the initial image pair; and perform a depth-constrained optimization to incrementally update the camera pose.

2. The system of claim 1, wherein the executable instructions include further instructions that, as a result of execution by the one or more processors, further cause the system to:

obtain a depth estimator, wherein the dense depth map is determined based on the depth estimator.

3. The system of claim 2, wherein the depth estimator is a pretrained depth estimator.

4. The system of claim 1, wherein the set of depth priors is based on the set of keypoints and the dense map.

5. The system of claim 1, wherein the depth-constrained optimization is based at least in part on the set of keypoints and the set of depth priors.

6. The system of claim 1, wherein the set of keypoints include a set of 2-D keypoints.

7. The system of claim 1, wherein the instructions to perform the initialization based at least in part on the set of keypoints and the corresponding set of depth priors to determine an initial image pair include instructions that, as a result of execution by the one or more processors, cause the system to:

determine, for the plurality of image frames, a plurality of 3-D points comprising at least a first 3-D point, wherein the first 3-D point is determined based at least in part on:

a first 2-D keypoint of a first image frame;

a first depth prior of the first 2-D keypoint; and a first intrinsic matrix associated with the first image frame.

8. The system of claim 1, wherein the initial image frame pair comprises a first image frame and second image frame of the plurality of image frames, and wherein the initial image frame pair is selected based at least in part on how many 2-D keypoint correspondences are in the second image frame and the first image frame.

9. The system of claim 1, wherein the set of depth prior are extracted from a plurality of dense depth maps using bilinear interpolation.

10. The system of claim 1, wherein the executable instructions include further instructions that, as a result of execution by the one or more processors, further cause the system to:

determine a camera pose based at least in part on a first objective function, wherein the first objective function that is used to minimize a first loss determined based at least in part on:

a reprojection error for a set of inlier keypoints; and a depth consistency error for the set of inlier keypoints.

11. The system of claim 1, wherein the executable instructions include further instructions that, as a result of execution by the one or more processors, further cause the system to:

add one or more 3-D points to a point cloud via triangulation that is refined based at least in part on a second objective function that is used to minimize a second loss determined based at least in part on:

a reprojection error for the one or more 3-D points; and a depth consistency error for the one or more 3-D points.

12. The system of claim 1, wherein a majority of the plurality of image frames have parallax of 1.0 or less.

13. A non-transitory computer-readable storage medium storing executable instructions that, as a result of being executed by one or more processors of a computer system, cause the computer system to at least:

obtain a plurality of image frames from a digital content item that corresponds to a scene;

determine, based at least in part on a correspondence search, a set of keypoints for the plurality of image frames;

determine, a dense depth map for one of the plurality of image frames;

determine, based at least in part on the set of keypoints and the dense depth map, a corresponding set of depth priors for the set of keypoints;

perform an initialization based at least in part on the set of keypoints and the corresponding set of depth priors to determine an initial image frame pair; and determine a camera pose based at least in part on the initial image pair.

14. The non-transitory computer-readable storage medium of claim 13, wherein the executable instructions include further instructions that, as a result of execution by the one or more processors, further cause the computer system to:

perform a depth-constrained optimization to incrementally update the camera pose based at least in part on the set of keypoints, and the corresponding set of depth priors.

15. The non-transitory computer-readable storage medium of claim 14, wherein the depth-constrained optimization is based at least in part on the set of keypoints and the set of depth priors.

16. The non-transitory computer-readable storage medium of claim 13, wherein the set of depth priors is based on the set of keypoints and the dense map.

17. The non-transitory computer-readable storage medium of claim 13, wherein the instructions to perform the initialization based at least in part on the set of keypoints and the corresponding set of depth priors to determine an initial image pair include instructions that, as a result of execution by the one or more processors, cause the computer system to:

determine, for the plurality of image frames, a plurality of 3-D points comprising at least a first 3-D point, wherein the first 3-D point is determined based at least in part on:

a first 2-D keypoint of a first image frame;

a first depth prior of the first 2-D keypoint; and a first intrinsic matrix associated with the first image frame.

18. The non-transitory computer-readable storage medium of claim 13, wherein the initial image frame pair comprises a first image frame and second image frame of the plurality of image frames, and wherein the initial image frame pair is selected based at least in part on how many keypoints correspondences are in the second image frame and the first image frame.

19. The non-transitory computer-readable storage medium of claim 13, wherein the executable instructions include further instructions that, as a result of execution by the one or more processors, further cause the computer system to:

determine a camera pose based at least in part on a first objective function, wherein the first objective function that is used to minimize a first loss determined based at least in part on:

a reprojection error for a set of inlier keypoints; and a depth consistency error for the set of inlier keypoints.

20. The non-transitory computer-readable storage medium of claim 13, wherein the executable instructions include further instructions that, as a result of execution by the one or more processors, further cause the computer system to:

add one or more 3-D points to a point cloud via triangulation that is refined based at least in part on a second objective function that is used to minimize a second loss determined based at least in part on:

a reprojection error for the one or more 3-D points; and a depth consistency error for the one or more 3-D points.

* * * * *